June 12, 1956 — D. R. STUART — 2,750,057
APPARATUS FOR LIFTING LOADS
Filed March 6, 1952 — 4 Sheets-Sheet 1

*INVENTOR:*
DONALD R. STUART
BY
ATT'Y

June 12, 1956  D. R. STUART  2,750,057
APPARATUS FOR LIFTING LOADS
Filed March 6, 1952  4 Sheets-Sheet 2
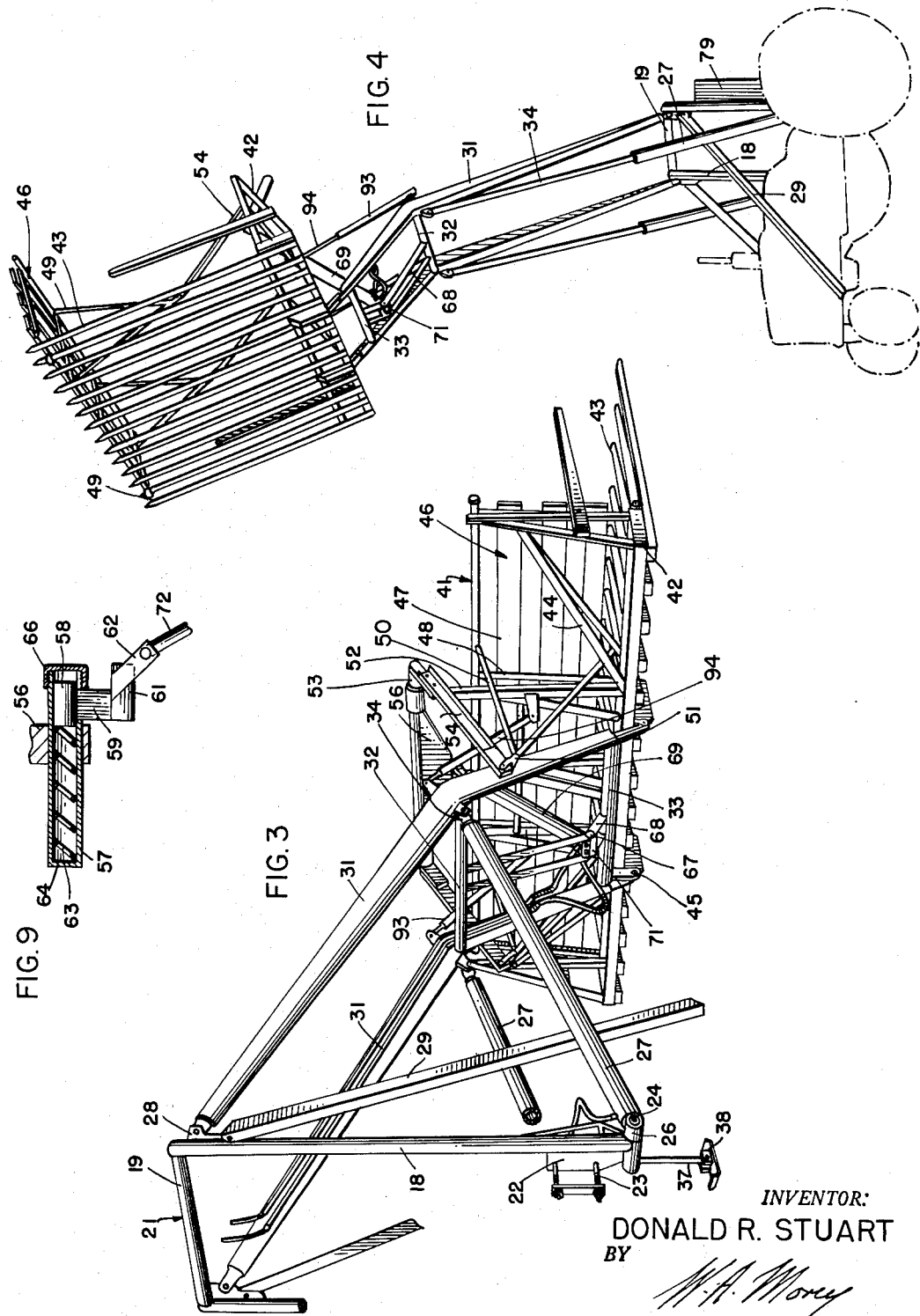
INVENTOR:
DONALD R. STUART
BY
ATT'Y June 12, 1956  D. R. STUART  2,750,057
APPARATUS FOR LIFTING LOADS
Filed March 6, 1952  4 Sheets-Sheet 3

INVENTOR:
DONALD R. STUART
BY
ATT'Y

June 12, 1956
D. R. STUART
2,750,057
APPARATUS FOR LIFTING LOADS
Filed March 6, 1952
4 Sheets-Sheet 4
FIG. 7
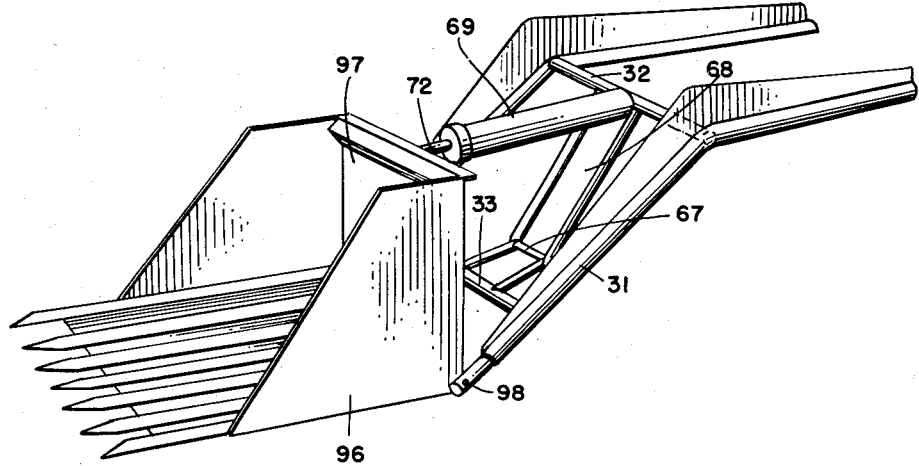
FIG. 8
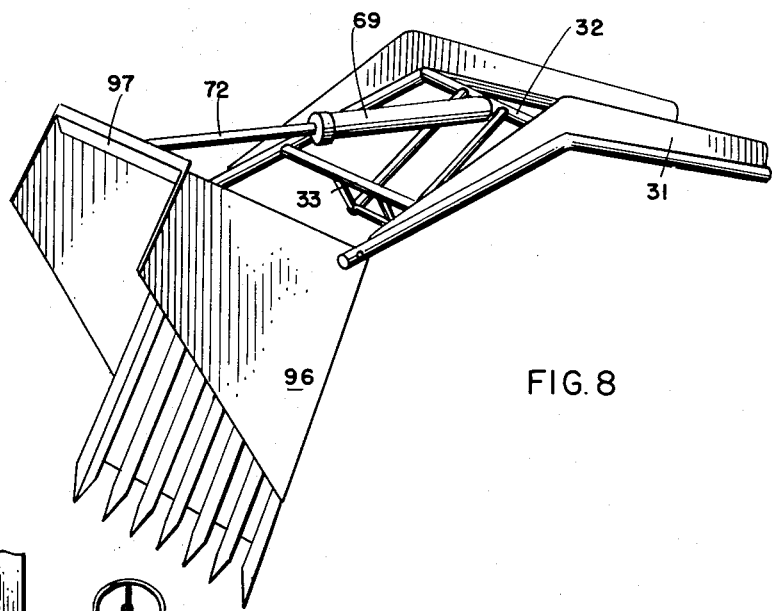
FIG. 10
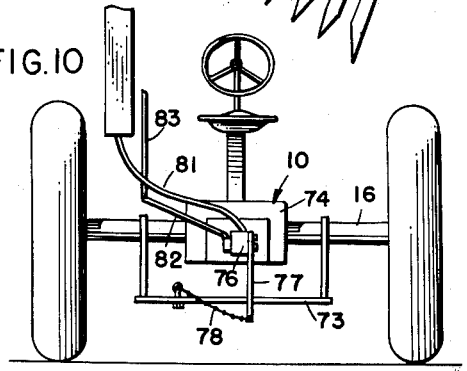
INVENTOR:
DONALD R. STUART
BY
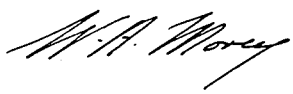
ATT'Y

United States Patent Office 2,750,057
Patented June 12, 1956

2,750,057

APPARATUS FOR LIFTING LOADS

Donald R. Stuart, Omaha, Nebr., assignor to American Road Equipment Co., Omaha, Nebr., a corporation of Delaware Application March 6, 1952, Serial No. 275,090

5 Claims. (Cl. 214—510)

This invention relates generally to load lifting apparatus of the type adapted for mounting on a tractor and relates more specifically to a tractor borne implement for stacking and unstacking hay and similar materials.

One of the primary objects of my invention is to provide a simple, efficient and relatively inexpensive apparatus adapted for mounting on a tractor which will by forward movement of the tractor gather a load of material such as hay, transport the load to a remote point, elevate the load a substantial distance, tilt the load carrying unit and if desired forcibly discharge the load.

Another important object of my invention is the provision of apparatus of the type described which may be easily attached to and detached from a tractor and which incorporates novel means for controllably tilting the load carrying unit.

A further important object of my invention is the provision of a novel shock absorber coupling for use between a servo-motor and a rock shaft, particularly in connection with my load discharging device.

Further objects of my invention, referring to various novel components and combinations thereof, will be disclosed in the course of the following detailed description and the appended drawings in which:

Figure 3 is a partial perspective of my device;

Figure 4 is a perspective illustrating my device in elevated position;

Figure 7 is a partial perspective of a portion of my device using a modified form of load lifting member;

Figure 8 illustrates the device shown in Figure 7 but in tilted position;

Figure 9 is a vertical section through a novel form of shock absorber employed in my device; and Figure 10 is a partial elevation of the rear of a tractor bearing my implement.

Figures 1, 2:
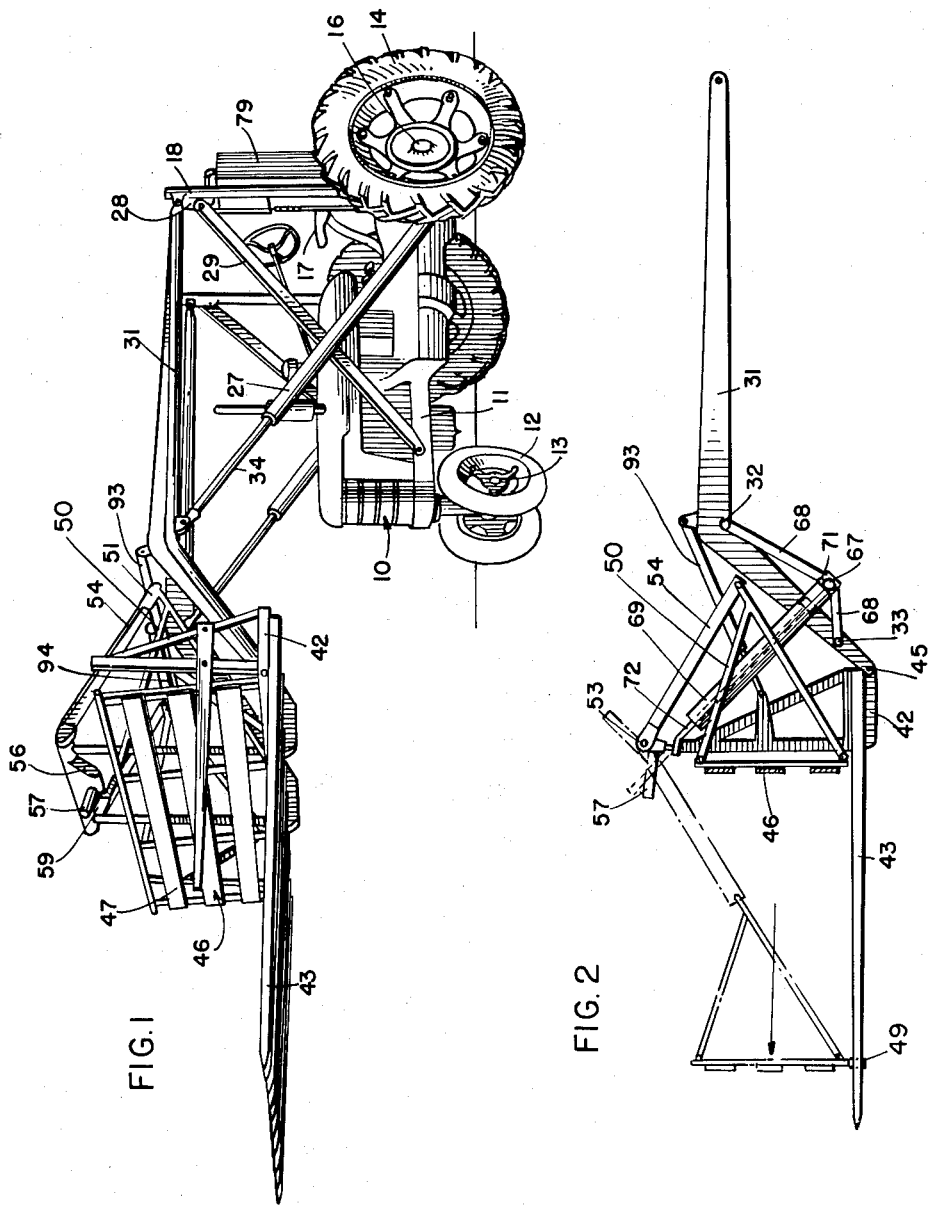
Figure 1 is a perspective view of my device mounted on a wheeled tractor.
Figure 2 is a vertical section through a portion of my device.
Figure 5:
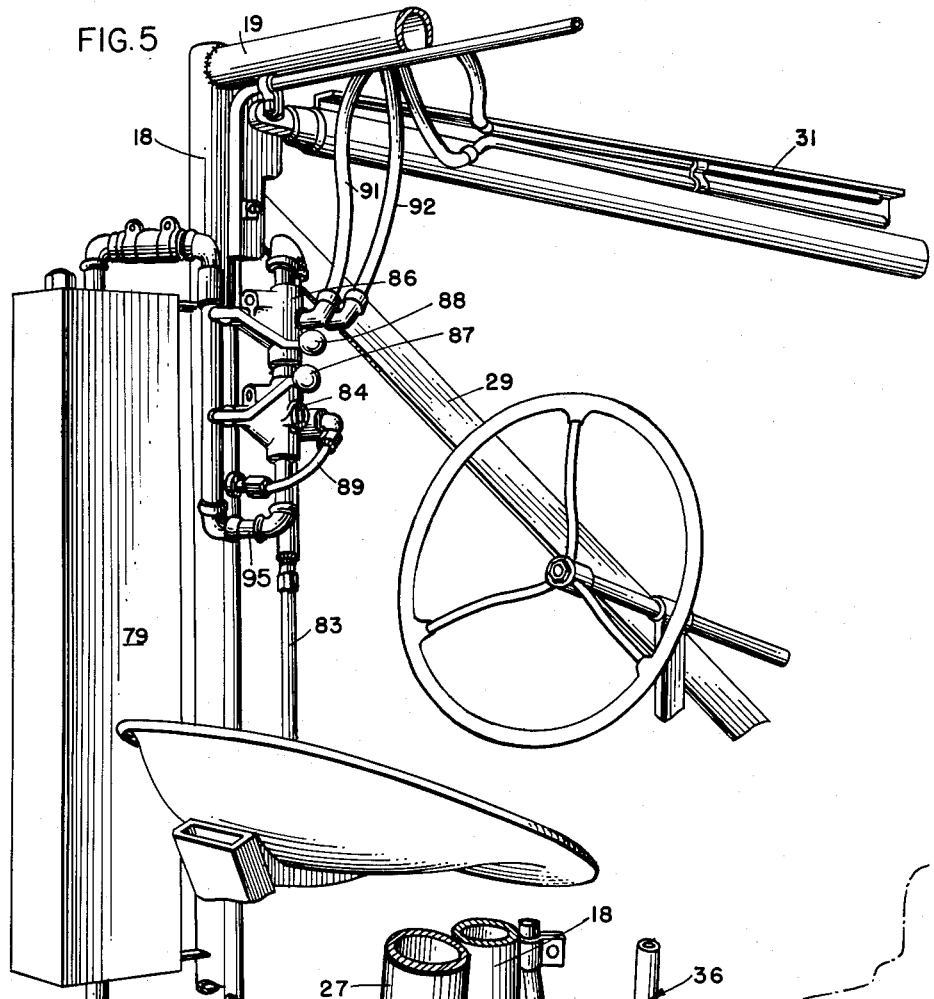
Figure 5 is a partial perspective of my device referring particularly to the control means.
Figure 6:
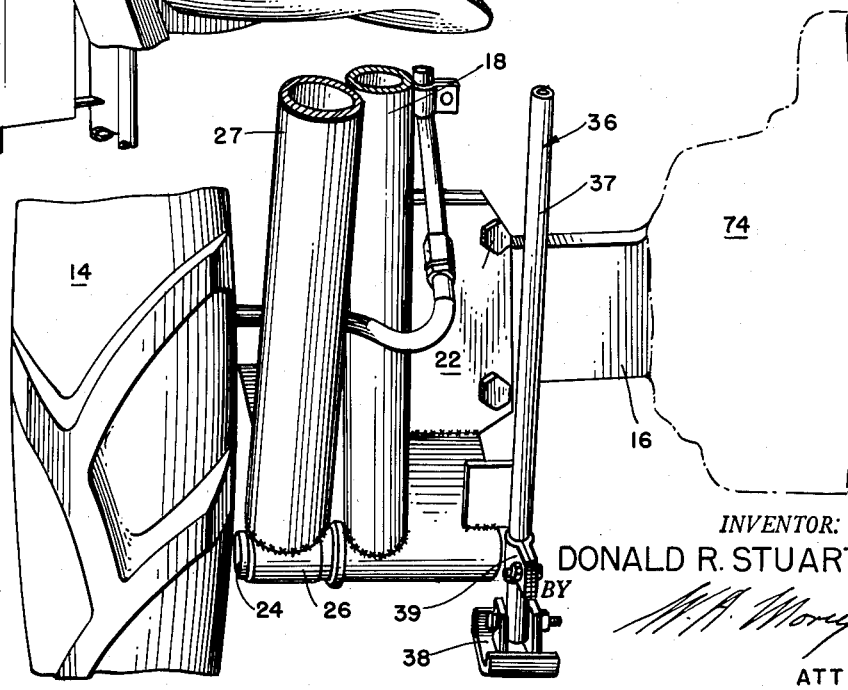
Figure 6 is a partial perspective of my invention illustrating the connecting means between my device and the tractor and novel implement support means.

Referring to Figure 1, I have illustrated a conventional four-wheeled farm tractor 10 having a frame 11, front wheels 12, a front axle 13, rear wheels 14 and rear axle 16. The rear wheels 14 are spaced outwardly a substantial distance from the frame 11, the portion of the axle 16 lying between the frame and each of the wheels having sections of polygonal contour for receiving and supporting implements. An operator's seat 17 is mounted in conventional manner on the frame 11 between the rear wheels 14.

My implement, as shown in Figures 1, 2 and 3, includes a pair of cylindrical uprights 18 connected at their upper extremity by a cross member 19, thereby forming a yoke, generally designated 21. Projecting brackets 22 are secured, as by welding, to the lower extremities of the upright 18 and are provided with clamp bolts 23 by means of which the yoke 21 may be secured to the rear axle 16 of the tractor 10. Transverse shaft 24 are secured to the lower extremities of uprights 18 and extend outwardly therefrom a distance sufficient to receive and pivotally support eyes 26 each welded to an end of an elongated cylinder 27.

Forwardly extending brackets 28 are welded to the forward faces of each of the uprights 18 and pivotally support elongated braces 29, suitably formed at their forward extremities for attachment to the forward portion of the frame 11. Parallel booms 31 are also pivotally secured to the brackets 28 and extend forwardly and downwardly from the yoke to a cross member 32 which rigidly connects the booms 31. The booms 31 are bent downwardly at this point, extending at a somewhat sharper angle substantially to ground level, the forward ends of the booms 31 being connected by a cross member 33 parallel to the cross member 32. Piston rods 34 are slidably sealed in their respective cylinders 27 and each pivotally engages one of the booms 31 near the cross member 32. Support feet, generally designated 36, consisting of a leg 37 and a foot 38, are provided for supporting the yoke 21 when not attached to a tractor. These feet are vertically adjustable and provided with clamp means 39 carried by the bracket 22, the upright 18 or other member rigid with the yoke 21. The height of the yoke 21 and the spacing of the booms 31 and the cylinders 27 are such that the forward portion of the tractor 10 may be easily driven into the implement, the cross bar 32 being positioned sufficiently forward to permit contact between the rear tractor axle 16 and the brackets 22 before the tractor contacts cross bar 32.

A hay basket, generally designated 41, is pivotally attached as by pins 45, to the forward extremities of the booms 31 and includes an upwardly extending frame 42 of generally triangular cross section to which forwardly projecting spaced teeth 43 are secured. Diagonal brace members 44 are secured to the frame to stiffen the structure. A push-off fence, generally designated 46, is mounted for reciprocating movement along the teeth 43 and consists essentially of a plurality of generally horizontal wooden slats 47 connected by upright bars 48 and provided with stirrups 49 which engage selected teeth 43 to guide the fence during movement. Two pairs of rods 50 are secured to the push-off fence 46 and extend rearwardly from the upper and lower extremities thereof through the frame 42, the members of each pair being joined at their rear extremities by a clevis 51.

The frame 42 includes a pair of relatively heavy centrally disposed, upright members 52, spaced outwardly a slight distance beyond the pins 45. A rock shaft 53 is journaled on the upper portions of the uprights 52 and connected pivotally to the clevises 51 by arms 54 secured to opposite ends of the rock shaft 53. A downwardly projecting arm 56 is welded to the rock shaft 53 and supports a transversely disposed cylinder 57 secured to the arm 56. Within the cyinder 57 (Figure 9) is a piston 58 having a depending lug 59 which projects outwardly through a slot in the cylinder 57. An arm 61 generally parallel to the cylinder is welded to the lug 59 and to a clevis 62. Resilient means, such as a spring 63, is placed within the cylinder in such manner as to urge the piston 58 rearwardly. Preferably the forward end of the cylinder 57 is closed as by a wall 64, the opposite end being sealed by a cap 66 threaded to the cylinder 57.

A transverse shaft 67 is secured at opposite ends to members 68 welded to the cross members 32 and 33, respectively. A double acting cylinder or servo-motor 69 is provided at its closed end with a removable cap 71 shaped to permit pivotal attachment of the cylinder 69 to the shaft 67, the cross member 32 or the cross member 33 if desired. A rod 72 is attached to a piston within the cylinder 69 and pivotally connected to the clevis 62.

The tractor 10 is provided with a conventional drawbar 73 below the rear axle 16 and a power take-off (not shown) extending rearwardly from a differential housing 74. A positive displacement hydraulic pump 76, preferably of a gear type, is provided with means for attachment to the power take-off and with a rigid downwardly projecting arm 77, the lower extremity of which is connected by a chain 78 to the drawbar 73, the chain restraining rotation of the pump. An oil reservoir 79 is supported on one of the uprights 18 and connected with the pump 76 through a flexible inlet hose 81. The pump 76 discharges through a flexible outlet hose 82 to a pipe 83 communicating with valve boxes 84 and 86. Valve levers 87 and 88 are mounted in the boxes 84 and 86, respectively, the lever 87 controlling a valve having an outlet 89 communicating with the lifting cylinders 27. The valve lever 88 controls a second valve which communicates with the double acting cylinder 69 through conduits 91 and 92. An oil return line 95 extends from the valve boxes 84 and 86 to the reservoir 79 and is provided with a suitable relief valve (not shown) set at a predetermined pressure.

A pair of hollow cylindrical members 93 are pivotally attached to the upper portions of the booms 31 near the crossbar 32. Rods 94 are mounted for reciprocal movement within the cylinders 93 and are pivotally attached to the upper portion of the frame 42 in order to limit the maximum arcuate movement of the frame 42 with respect to the booms 31. Preferably, although not necessarily, the cylinders 93 and arms 94 are of such length as to permit arcuate movement of the basket from the position shown in Figure 3 to the position shown in Figure 4. In the former position, teeth 43 are generally parallel to the ground, while in the latter position they are generally parallel to the rearward portion of the booms 31.

My implement is prepared for mounting on the tractor by lowering the feet 36 a distance sufficient to support the bracket 22 at the elevation of the rear axle 16, this operation normally being performed at the time the implement is detached from the tractor. The forward ends of the braces 29 rest on the ground as does the basket 41 to which the booms 31 are pivotally attached. The tractor is driven into the space defined by the yoke 21, the cylinders 27, the booms 31 and the cross member 32 until the rear axle 16 is in position against the brackets 22, at which time the bolts 23 are utilized to clamp the axle 16 to the bracket 22. The forward ends of the braces 29 are then raised and bolted to the forward portion of the tractor frame 11, after which the feet 36 may be raised and clamped in raised position. The pump 76 is then attached to the power take-off and the chain 78 attached to the drawbar.

As the tractor engine is driven, operation of the power take-off drives the pump 76 which continuously draws hydraulic fluid, such as oil, from the reservoir 79, discharging it through the valves 84 and 86 to the reservoir 79. As the operator moves the valve lever 87 by movement in one direction, the reservoir port is closed and pressure fluid is admitted into the single acting cylinders 27, thus forcing the rods 34 outwardly and elevating the booms 31 and the basket 41. Movement of the valve in the other direction permits discharge of the liquid in the cylinders 27 to the reservoir 79 in conventional manner. Detachment of my implement is of course accomplished by reversal of the above described sequence of operations, the feet 36 being lowered to the ground and clamped before detaching the bolts 23.

When the hay basket 41 is attached to the booms 31, the double acting cylinder 69 is preferably attached to the transverse shaft 67. The tractor carrying my implement is driven forward until a load of hay or other similar material is positioned on the teeth 43, the push-off fence 46 being retracted during this operation. Raising the booms 31 will not effect the angular relationship between the basket 41 and the booms 31 in any manner whatsoever, this being controlled exclusively by the cylinder 69. Usually, however, during lifting operation, both valves 87 and 88 will be moved by the operator in such manner that as the booms 31 are elevated, the angle of the basket 41 with respect to the booms is increased until the teeth 43 are approximately parallel to the rear portion of the booms 31 as illustrated in Figure 4. This movement is accomplished by admitting liquid under pressure to the lower portion of the cylinder 69 thus permitting the frame 42 to tilt downwardly about its pivots 45 until the rods 94 are fully extended, at which point further angular movement of the basket is restrained by the rods 94 and the cylinders 93.

The admission of the additional liquid under pressure to the lower portion of the cylinder 69 forces the rod 72 forwardly a greater distance which in turn drives the piston 58 forwardly against the pressure of the spring 63. As this pressure is increased, the cylinder 57, attached by the arm 56 to the rock shaft 53, gradually tilts, moving together with the rock shaft through an angle of approximately 90°. Movement of the rock shaft actuates the arms 54 which in turn drive the push-off fence 46 forwardly, thus discharging the load from the teeth 43. Reversal of the position of the valve 88 permits the discharge of the pressure fluid from the lower portion of the cylinder and admits pressure to the upper portion of the same cylinder, thus drawing the push-off fence 46 rearwardly until it engages the frame 42. Further rearward movement of the piston rod 72 tilts the basket 41 until it assumes the angular position illustrated in Figure 3.

When the teeth 43 are resting on the ground, the cylinder 57 is inclined upwardly to a minor extent, the double acting cylinder 69 being at an angle of approximately 45° to the ground. From this angular relationship, it will be seen that the initial force exerted by the rod 72 on the shock absorber assembly is such as to compress the spring 63. When the piston rod 72 is fully extended, however, the cylinder 57 is transverse to the direction of movement of the rod 72 with the result that virtually none of the pressure of the rod is transmitted to the spring. The spring therefore moves the push-off fence 46 further forward, recovering the portion of the piston stroke initially lost in compressing the spring 63. It has been found that the utilization of the shock absorber assembly described above is highly effective in preventing breakage, damage or undue stress to the operating parts of the push-off fence and does not sacrifice any of the effective stroke of the piston 69.

It should be noted from the foregoing description of the construction and operation of my device that only a single double acting cylinder is required to control the angular position of the basket and the actuation of the push-off mechanism where ordinarily separate cylinders are required for each of these operations.

Scoops or forks of other designs, such as the scoops 96 shown in Figures 7 and 8, may be substituted for the basket 41. The scoop 96 may for example include a rear wall 97 extending upwardly from pivot pins 98 by means of which the scoop 96 is pivotally secured to the forward extremities of the booms 31. The cap 71 is removed from the cylinder 69, the latter then being pivotally secured to the crossbar 32 and the cap 71 replaced in order to dispose the cylinder 69 at a satisfactory angular position with respect to the scoop 96. The telescopic restraining members 93 and 94 are of course unnecessary in actuating the scoop or other similar implement and are therefore disconnected from the booms 91.

From the foregoing, it will be apparent that the angular position of the scoop is completely under the control of the operator through the operation of the valve 88 which extends or contracts the rod 72, pivotally attached to the upper extremity of the rear wall 97 of the scoop 96, this control being independent of the position of the booms 31.

Since certain of the details described may be altered in obvious manner, I do not confine myself thereto except insofar as they may constitute essential parts of my invention and directly or impliedly be incorporated in the appended claims.

I claim:

1. Stacker apparatus comprising a basket frame, forwardly extending teeth on the basket frame, rearwardly extending parallel booms pivoted to the basket frame, a rigid member between the booms and secured thereto, means connecting the basket frame and booms and limiting free arcuate movement of the basket frame between first and second positions, a push-off device reciprocable along the teeth, a stop on the basket frame limiting rearward movement of the push-off device, means for reciprocating said device including a rock shaft journaled on the basket frame and an arm on the rock shaft, and a double acting cylinder and piston assembly pivotally and directly connected to said member and to said arm for actuating said push-off device when the frame is in said first position, the said cylinder being the sole means for maintaining said basket frame in said second position opposing movement of the basket frame by gravity.

2. Stacker apparatus comprising a basket frame, forwardly extending teeth on the lower portion of the basket frame, rearwardly extending parallel booms pivoted to the lower portion of the basket frame, a pair of spaced rigid members between the booms and secured thereto, means interconnecting the basket frame and booms limiting free arcuate movement of the basket frame between first and second extreme angular positions with respect to the booms, a push-off device reciprocable along the teeth from a rear position against the basket frame, a double acting cylinder and piston assembly pivotally and directly coupled to said push-off device near the upper portion of the basket frame for actuating said device when the basket is in said first extreme angular position, said piston and cylinder assembly being the sole means for maintaining said basket in said second extreme angular position opposing arcuate movement of said basket by gravity.

3. In a hay basket of the type having an upwardly extending frame for attachment to lifting booms, forwardly extending teeth on the frame, a push-off fence reciprocable along the teeth and mechanism including a rock shaft for reciprocating the push-off fence, the improvement which includes a transverse cylinder secured to the rock shaft and movable therewith, a piston movable with the cylinder, resilient means in the cylinder urging the piston in one direction, and means for coupling the piston to a servo-motor movable in opposition to the spring.

4. Apparatus for actuating a rock shaft through an arc not exceeding about 90° comprising a cylinder transverse to the rock shaft, a rigid member connecting the cylinder and rock shaft, a piston movable in the cylinder, resilient means in the cylinder urging the piston in one direction and a rigid member on the piston projecting through an elongated opening in the wall of the cylinder for pivotal connection to motor means.

5. Stacking apparatus for attachment to a tractor comprising a basket frame, forwardly extending teeth on the basket frame, rearwardly extending parallel booms pivoted to the lower portion of the basket frame for permitting limited pivotal movement between the basket frame and the booms, a yoke pivotally secured to the rear ends of the booms and adapted for attachment to the rear of the tractor, lifting cylinders coupled to the yoke and the booms, a rigid member between the booms and secured thereto, means for limiting arcuate movement of the basket frame with respect to the booms, a push-off fence reciprocable along the teeth, a rock shaft journaled on the upper portion of the basket frame, lever means connecting the rock shaft with the push-off fence, an arm projecting from the rock shaft, a cylinder secured to said arm transverse to the rock shaft, a piston movable in the cylinder, resilient means in the cylinder urging the piston in one direction, a rigid member on the piston projecting through a slot in the wall of the cylinder and a double acting cylinder and piston assembly pivotally connected between the rigid member carried by the booms and said rigid member on the piston for compressing the spring.

References Cited in the file of this patent

UNITED STATES PATENTS

| | | |
|---|---|---|
| 2,417,560 | McNamara | Mar. 18, 1947 |
| 2,418,661 | Palm | Apr. 8, 1947 |
| 2,496,079 | Wessman | Jan. 31, 1950 |
| 2,497,385 | Young et al. | Feb. 14, 1950 |
| 2,577,826 | Thierry | Dec. 11, 1951 |
| 2,595,661 | Horn | May 6, 1952 |
| 2,638,237 | Struthers et al. | May 12, 1953 |
| 2,654,494 | Stratman | Oct. 6, 1953 |
| 2,672,994 | Werner et al. | Mar. 23, 1954 |
| 2,701,072 | Chambers et al. | Feb. 1, 1955 |